Feb. 11, 1930. H. W. KIRCHNER 1,746,658
TRANSPORTATION SYSTEM
Filed April 24, 1925  2 Sheets-Sheet 2
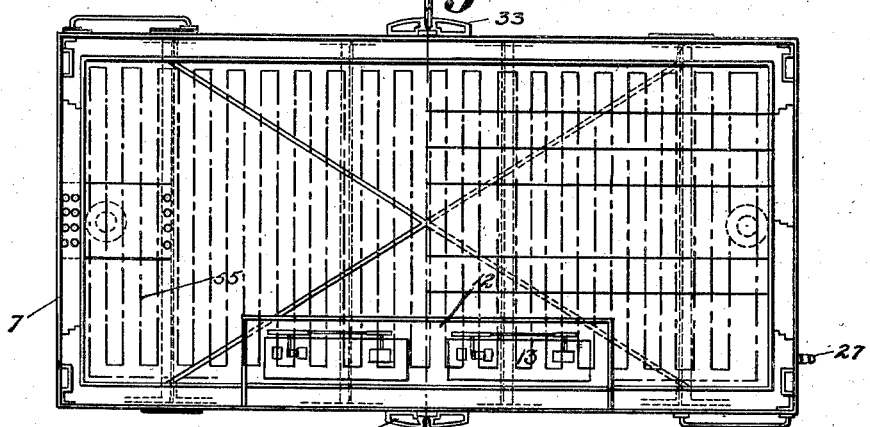
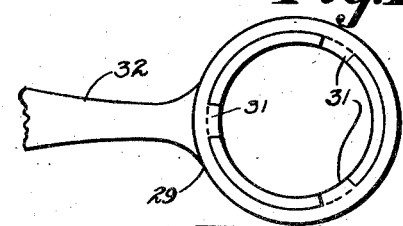
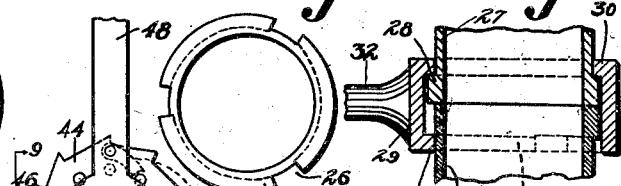
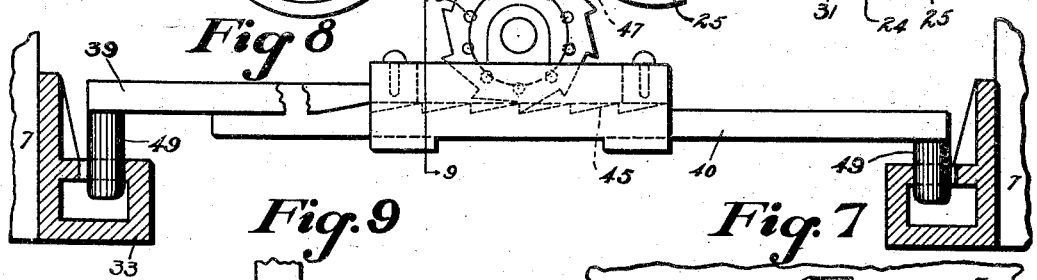
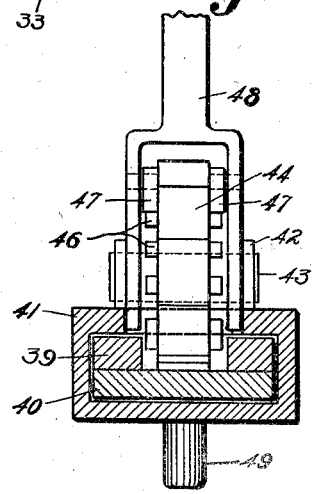
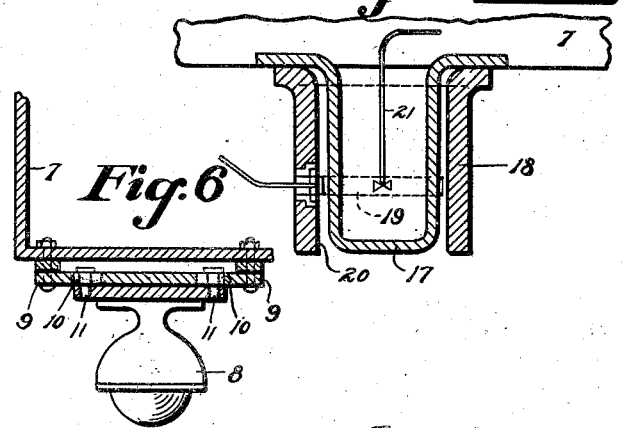

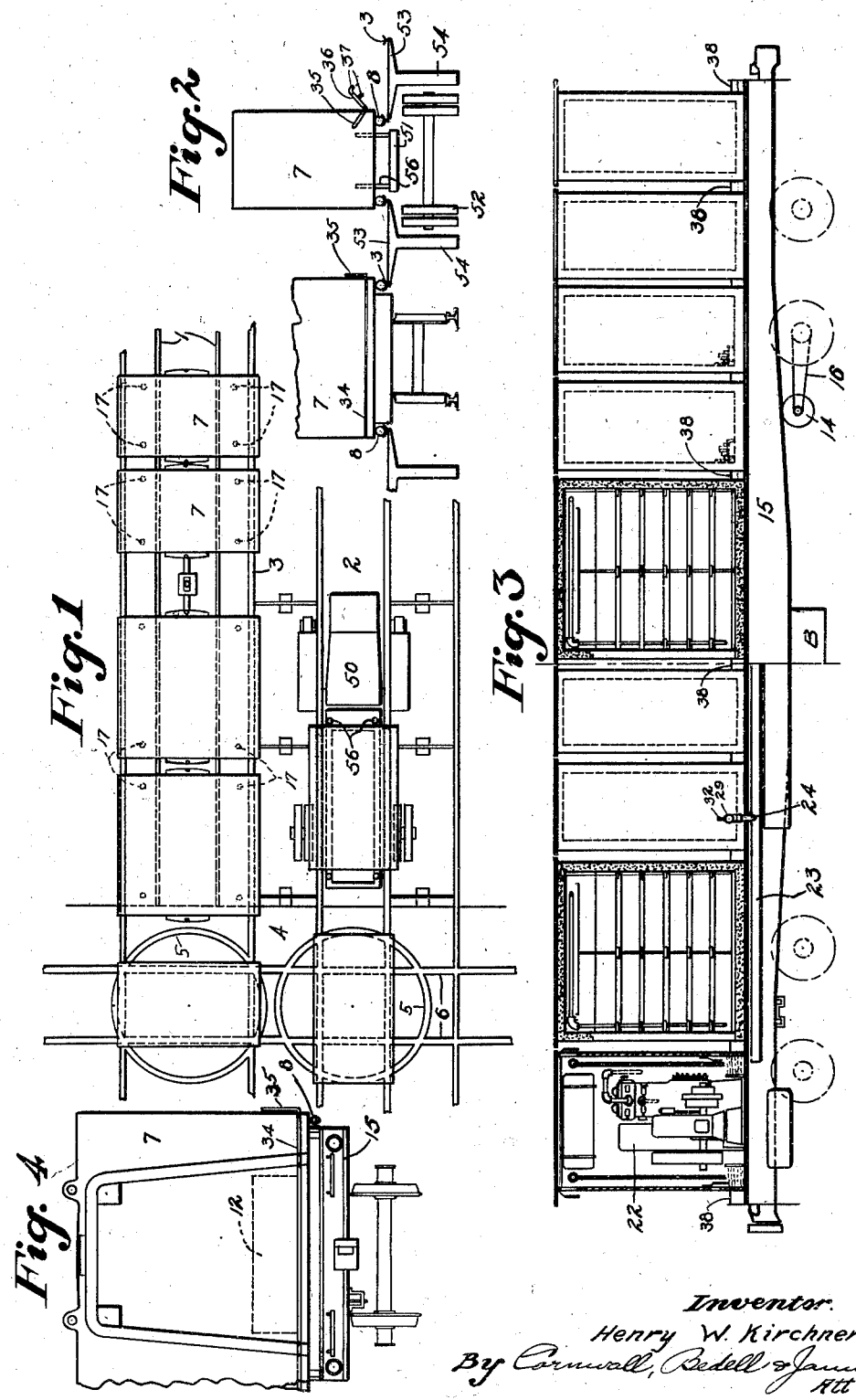

Patented Feb. 11, 1930

1,746,658

UNITED STATES PATENT OFFICE

HENRY W. KIRCHNER, OF ST. LOUIS, MISSOURI

TRANSPORTATION SYSTEM

Application filed April 24, 1925. Serial No. 25,552.

My invention relates to transportation systems which include merchandise containers and various carriers for the same, the containers being transferred from one carrier to another without disturbing merchandise. Such systems are illustrated in Patent No. 1,349,209, previously issued to me and my present invention deals particularly with arrangements of the container and carrier assembly illustrated in my copending application Serial No. 643,728, filed June 6, 1923, in which the containers may be loaded onto the carriers and unloaded from the carriers by means of ramp tracks paralleling the carrier road bed.

One of the objects of my invention is to adapt such a transportation system for the shipping of perishable products which require refrigeration during transit. I accomplish this object by constructing the containers with thermally insulated walls and by providing a space in each container for refrigerating apparatus.

Another object of my invention is to provide means for operating refrigerating apparatus in the containers which means may be energized from the carrier.

Another object of my invention is to provide means for coupling adjacent containers to each other so that they may not only be pushed along their ramp tracks but one of the containers may be pulled along the ramp tracks by a container in front of the same which is engaged by a carrier.

Another object of my invention is to adapt the anti-friction elements which support the containers from the ramp tracks so that the containers may be moved on said elements around curves in the ramp tracks without bending or undue resistance.

Another object of my invention is to provide containers and cooperating mechanism whereby two containers may be easily separated from each other to space them to accommodate the gap between two adjacent carriers.

Various other more specific objects of my invention may be disclosed in the description of the details of my invention which is illustrated in the accompanying drawings forming part of this application and in these drawings—

Figure 1 is a plan view of a portion of a terminal equipped for my transportation system and showing carrier road beds, a variety of carriers, associated ramp tracks, and containers.

Figure 2 illustrates an end view of a car and an end view of an adjacent truck together with containers mounted on the car and truck and the ramp track structure associated therewith.

Figure 3 is a side elevation of a carrier with refrigerator containers mounted thereon, some of the containers being sectioned to more clearly illustrate the structure.

Figure 4 is an end elevation of a container mounted on a carrier.

Figure 5 is a top view and horizontal section of a container drawn on an enlarged scale.

Figure 6 is a vertical section through one of the container supporting elements and its connection to the container.

Figure 7 is a vertical section through a detail of the connection between the power plant on the carrier and the container mechanism.

Figure 8 is a side view of a mechanism used to space adjacent containers.

Figure 9 is a vertical section through the structure shown in Figure 8.

Figures 10 and 11 are bottom and top views, respectively, of two connection elements used in a modification of my invention.

Figure 12 is a vertical section through these two elements when assembled.

The terminal illustrated in Figure 1 includes a plurality of carrier road beds, such, for instance, as the railway track 1 and a truck roadway 2. Paralleling these road beds are ramp tracks 3 which may extend onto a loading platform 4 or into a warehouse (not shown) and may be provided with circular tracks 5 whereby the containers may be turned as more fully described in my copending application referred to above. Transverse tracks 6 connect the tracks paralleling the carrier road beds and enable the merchandise containers 7 to be shifted from one ramp track to another.

These containers are equipped with antifriction supporting elements 8 detailed in Figure 6. The connection of elements 8 to the container includes a plate 9 slotted at 10 for the element attaching studs 11. The slots 10 extend transversely of the container and permit slight lateral movement of the supporting elements relative to the container so that when the latter is moved on a curved track the supporting elements will be able to adjust themselves to the difference between their centers.

Each of the containers illustrated comprises a refrigerator having inner and outer walls and thermal insulation such as cork, magnesia, felting, etc., between them. Each of the containers includes a compartment 12 adapted to contain refrigerating means for the container. This refrigerating means may consist of blocks of ice such as are ordinarily used in refrigerator cars. In my drawings I have illustrated this compartment as occupied by refrigerating apparatus 13 whereby each container carries its own refrigerating plant. I prefer, however, to energize the apparatus in each container from a power plant on the carrier. On the righthand end of Figure 3 I show a generator 14 mounted on the carrier 15 and driven by a belt connection 16 to the car axle to charge a storage battery B. The details of this generator and its connections to the car axle are unimportant and merely duplicate those used in car lighting equipment.

Each of the containers is provided with dowels 17 projecting downwardly from the container floor and the floor of the carrier is provided with sockets 18 for receiving container dowels 17. At least one socket 18 beneath each container will be connected to battery B and at least one dowel 17 on each container will be provided with a contact element 19 adapted to engage the dowel contact element 20 when the dowel is inserted into the socket. The dowel contact element 19 is connected through 21 to refrigerating apparatus 13. Obviously when the container is in place upon the carrier the connection with the battery is automatically closed and the refrigerating plant is complete.

The lefthand portion of Figure 3 illustrates a modified construction in which the carrier includes refrigerating machinery 22, and a pipe 23 for the cooling fluid extends from the refrigerating machinery along the side of the car and is adapted to be connected through branches 24 to the containers. The details of the connection between branch 24 and the containers are more clearly illustrated in Figures 10, 11, and 12 in which the branch 24 from pipe 28 is shown as terminating in a flange 25 having a plurality of slots 26. An inlet pipe 27 mounted on the container terminates in a flange 28 adapted to abut against flange 25 on branch 24 and a clamping element 29 has an upper flange 30 which engages the rear face of flange 28 and has inwardly projecting lugs 31 which engage the inner face of flange 25. These lugs may be passed through openings 26 in the flange and then by rotation of the member 29 by its handle 32 the lugs 31 are caused to ride up the inclined surfaces of flange 25 thus clamping branch 24 and inlet 27 together. The device forms a bayonet joint.

Where individual refrigerating apparatus is used as illustrated on the righthand side of Figure 3 or a single refrigerating plant is used for all the carriers as illustrated on the lefthand side of Figure 3, it will be understood that the container will be provided with suitable cooling pipes 55 so as to maintain a low temperature in the refrigerator containers.

The end of each of the containers 7 is provided with a buffer casting 33 located on the center line of the container and adapted to engage a similar buffer on an adjacent container whereby one container may push other containers ahead of it independently of any contact between the container walls or any other framing elements of the containers. I prefer to provide each buffer 33 with a vertical opening and to provide each container with a coupling device comprising a lever 34 extending transversely of the container and terminating at its outer end in a handle 35 and being provided over the buffer with an arm 36 having depending spaced fingers 37, one adapted to enter the hole in the buffer 33 on that container and the other finger being adapted to enter the hole in the buffer on an adjacent container. By means of these coupling devices, one container may pull another along ramp or storage tracks. By the use of this coupling arrangement, two adjacent containers may be coupled together from the side of the carrier or by workmen positioned outside of the ramp track.

With this arrangement it is possible for one or more carriers to be run under a string of containers positioned on the ramp tracks and by engaging the outer one of the containers with a suitable carrier element the carriers may be withdrawn from between the ramp tracks and will pull all the containers along with the first one so as to load the containers on the carriers as they descend the incline in the ramp tracks. The container engaging elements on the carriers are indicated at 38 in Figure 3 and may take the form of any elements adapted to be projected upwardly from the carrier into engagement with suitable elements of the container. A form of these members and operating mechanism therefor is more clearly illustrated and described in my above-mentioned copending application.

In assembling containers on the ramp track for loading into a string of carriers, it may be desirable to space the containers to accommodate the space between adjacent carriers. The dowels on the containers and the sockets on the carriers will be so arranged that when the container dowels are inserted in the carrier sockets, the containers will be positioned adjacent to each other with their buffers 33 substantially contacting. Hence similar arrangement of the containers on the ramp tracks will position the dowels so as to enter the sockets on the carrier. In order to space two containers which will be mounted, respectively, on the adjacent ends of two carriers, I provide a spacing device illustrated in Figures 8 and 9, and comprising two members 39 and 40 telescopically assembled with each other by means of a frame 41 secured to member 39. Frame 41 carries supports 42 for a pin 43 which journals a ratchet 44 which engages teeth 45 provided on the upper surface of member 40. The side faces of ratchet 44 are provided with projecting pins 46 and by engagement of these pins by ratchets 47 mounted on an operating lever 48 the telescoping members 39 and 40 may be forced apart. The outer end of each member 39 and 40 is provided with a depending finger 49 which may be inserted in the openings in buffers 33. When the spacing device is fully extended it may serve as a coupling link between the two containers, or a second link consisting of a round rod with downturned ends may be substituted for the spacer.

In the embodiment of my transportation system illustrated in the accompanying drawings, the containers 7 are wide enough to project beyond the sides of the carrier 15 and the ramp tracks adjacent the carrier may be supported by any convenient means providing the latter do not extend inwardly so as to interfere with the carrier framing. The length of containers 7 is much smaller than their width and as shown each container is adapted to be a complete load for a motor truck of the size illustrated at 50 in Figure 1. In Figure 2 the ends of containers 7 are shown as projecting beyond the sides of the truck bed 51 but not far enough to project outside of the truck wheels 52. To accommodate this relation between the dimensions of the container and of the truck the ramp tracks 3 are mounted upon cross arms 53 which are supported at their centers by suitable posts 54. This arrangement of the ramp tracks and their supporting posts may be followed throughout the terminal with resulting economy in construction and with maximum accommodation of the carriers.

This bed of the truck shown in Figures 1 and 2 will have suitable openings for dray pins 56 which may be inserted by the driver after the container is placed on the truck body. These dray pins will prevent movement of the container on the truck body and will afford engaging elements whereby the truck may move the container up or down the incline of the ramp tracks so as to unload or load the container on the truck.

With the above described construction of the containers, carriers, and trackage in mind, the operation of the system will be readily understood. Assuming the use of the system by a packer of meat products, for instance, the packer will load a plurality of containers in his warehouse and will push the containers individually or in strings by hand or by means of electric mules onto the ramp tracks adjacent his warehouse. A train of carriers will be run between the ramp tracks and under the containers and the container posts 38 elevated to engage the containers and the carriers then moved outwardly from the terminal. The containers will be drawn along the ramp tracks and will descend onto the carriers, their dowels 17 entering sockets 20 and automatically connecting the generator on the carriers with the refrigerating apparatus in the containers. The generator current will, of course, be controlled by suitable switches and assuming that these are closed, the refrigerating apparatus will function to reduce the temperature in the containers to a desired point. Upon the arrival of the train of carriers at a point of destination of one of the containers, the carrier may be run into an unloading ramp track whereupon as the container travels up the incline of the ramp track it will be unloaded from the carrier. The interengaging element between the carrier and container will be withdrawn and the carrier may proceed on its journey, leaving the container on the ramp track. A truck may be run in between the ramp tracks and under the container or the container may be moved over the ramp tracks to other truck loading ramp tracks. When the truck is beneath the container, dray-pins 56 are inserted in the truck bed and the truck driven off, the container automatically being loaded onto the truck bed. With this system there is no need of large refrigerator cars with proportionate ice storage capacity nor is it necessary to open the large refrigerator cars now in use to remove the meat for a particular station. The meat is kept in a cool temperature from the time it leaves the packer's warehouse until it is delivered to the jobber or retailer to whom it is consigned and the latter may keep the meat in the container without transferring it to another refrigerator and may return an empty container which he has secured on a previous shipment.

While I have described briefly the use of my system in the transportation of meat products, it will be understood that the field of the use of my invention is not so limited but may include the transportation of fruit and many other perishable products. Obviously many of the details of my invention are applicable to the containers and carriers of systems previously in use which involve the use of merchandise containers of the general type illustrated.

Obviously many modifications in the details of my invention may be made without departing from the spirit thereof as expressed in the appended claims.

I claim:

1. In a transportation system, a carrier and a plurality of merchandise containers to be mounted on or removed from said carrier, a source of energy on said carrier, connections from said source of energy to each of said containers, and refrigerating apparatus associated with each container and operated by energy from said source.

2. In a transportation system, a carrier and a plurality of merchandise containers to be mounted on or removed from said carrier, a source of energy on said carrier, means automatically connecting said source of energy to each of said containers when the latter are positioned on said carrier, and refrigerating apparatus associated with each container and operable by energy from said source.

3. In combination, a railway carrier including wheeled axles, a dynamo operated by one of said axles, a merchandise container removably positioned on said carrier, refrigerating apparatus in said carrier, and means for automatically operatively connecting said apparatus and dynamo when said container is positioned upon said carrier.

4. In combination, a carrier having a floor provided with a socket, a source of energy on said carrier, a merchandise container removably positioned on said carrier, a machine carried by said container, a dowel on said container for entering said socket, and means for automatically connecting said source of energy and said machine when said dowel enters said socket.

5. In combination, a carrier having a floor provided with a socket, a merchandise container removably positioned on said carrier, a dowel on said container for entering said socket, electrical contacts on said socket and dowel, an electric generator and electrical equipment on said carrier and container, respectively, and individual electric connections between said socket and generator and between said dowel and equipment.

6. In combination, a carrier, a carrier road bed, ramp tracks paralleling said road bed, a merchandise container to be mounted on said carrier and having elements for engaging said ramp tracks, refrigerating apparatus in said container, a source of energy on said carrier for operating said apparatus, and a connection between said apparatus and source of energy adapted to be made or unmade automatically as said container is moved along said ramp track.

7. In combination, a carrier, a plurality of containers having anti-friction supports and mounted adjacent each other on said carrier, and means for coupling adjacent containers together so that they may be moved as a unit along said carrier.

8. In combination, a carrier, a plurality of containers having anti-friction elements adapted to engage ramp tracks, and means for coupling said containers to each other independently of said carriers so that said containers may be moved as a unit along said carrier or said tracks.

9. In combination, a carrier, a plurality of containers having anti-friction elements adapted to engage ramp tracks, means for coupling said containers to each other independently of said carriers so that they may be moved along said carrier or along said tracks, individual dowels projecting downwardly from the floors of said containers, and sockets in the floor of said carrier for receiving said dowels.

10. In combination, a carrier, merchandise containers each detachably secured in position on said carrier and provided with anti-friction supporting elements adapted to engage tracks at the side of said carrier, and interengaging connections mounted on said containers whereby the latter may be pulled on said elements over suitable tracks.

11. In combination, a carrier, merchandise containers each detachably secured in position on said carrier and provided with anti-friction supporting elements adapted to engage tracks at the side of said carrier, interengaging connections mounted on said containers whereby the latter may be pulled on said elements over suitable tracks, buffers projecting longitudinally of each container at the center thereof, a coupling lever extending transversely of each container, and an element on said lever for engaging a buffer on an adjacent container.

12. In combination, a carrier, merchandise containers each detachably secured in position on said carrier and provided with anti-friction supporting elements adapted to engage tracks at the side of said carrier, buffers projecting longitudinally of each container at the center thereof, a coupling lever extending transversely of each container and operable from the side of the carrier, and an element on said lever over said buffer for engaging a buffer on an adjacent container.

13. In combination, a carrier, merchandise containers each detachably secured in position on said carrier and provided with anti-friction supporting elements adapted to engage tracks at the side of said carrier, buffers projecting longitudinally of each container at the center thereof, an opening in the center of each buffer, a coupling lever extending transversely of each container and over a respective buffer, an arm on said lever with spaced depending fingers adapted to enter said openings on two adjacent buffers and couple the corresponding containers together.

14. In combination, a carrier, merchandise containers each removably secured in position on said carrier and provided with anti-friction supporting elements adapted to engage a track at the side of the carrier, a coupling lever extending transversely of each container, and an element on each container adapted to be engaged by such a lever on an adjacent container.

15. In combination, a carrier, merchandise containers each removably secured in position on said carrier and provided with anti-friction supporting elements adapted to engage a track at the side of the carrier, a coupling lever extending transversely of each container, and an element on each container at the center of the end thereof adapted to be engaged by such a lever on an adjacent container.

16. In a transportation system, a carrier, a plurality of merchandise containers to be mounted on or removed from said carrier, a source of energy on said carrier, mechanism in each of said containers, and means automatically connecting said source of energy to each of said containers when the latter are positioned on said carrier.

17. In a transportation system of the class described, merchandise containers, anti-friction supporting elements for said containers adapted to engage container tracks, and connections for said elements on said containers adapted to permit lateral movement of said elements on said containers as said elements are moved over curved tracks.

In testimony whereof I hereunto affix my signature this 20th day of April, 1925.

HENRY W. KIRCHNER.